(12) United States Patent
Akahori

(10) Patent No.: US 8,887,934 B2
(45) Date of Patent: Nov. 18, 2014

(54) SIDE COVER STRUCTURE OF AN ELECTRIC CONNECTING BOX

(75) Inventor: Masahiro Akahori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1072 days.

(21) Appl. No.: 12/662,903

(22) Filed: May 11, 2010

(65) Prior Publication Data

US 2010/0288757 A1    Nov. 18, 2010

(30) Foreign Application Priority Data

May 14, 2009   (JP) .................................. 2009-117822

(51) Int. Cl.
    *H02G 3/14*    (2006.01)
(52) U.S. Cl.
    USPC ............ 220/3.8; 220/4.02; 220/3.7; 220/3.94
(58) Field of Classification Search
    USPC ......... 220/3.7, 3.8, 3.92, 3.94, 811, 813, 814, 220/820, 824, 825, 4.01, 4.02, 241, 242; 174/50, 66, 67; D13/177
    See application file for complete search history.

(56) References Cited

U.S. PATENT DOCUMENTS

| | | | | |
|---|---|---|---|---|
| 2,086,534 | A * | 7/1937 | Byrne | 220/811 |
| 3,024,899 | A * | 3/1962 | Reitzel | 206/1.5 |
| 4,098,423 | A * | 7/1978 | Marrero | 220/3.6 |
| 4,548,330 | A * | 10/1985 | Hewitt et al. | 220/210 |
| 5,141,123 | A * | 8/1992 | Onodera | 220/4.02 |
| 5,311,643 | A * | 5/1994 | Marquardt et al. | 16/267 |
| 6,133,531 | A * | 10/2000 | Hayduke et al. | 174/67 |
| 6,315,154 | B1 * | 11/2001 | Newby, Sr. | 220/844 |
| 8,342,345 | B2 * | 1/2013 | Steele | 220/4.03 |
| 2014/0131061 | A1 * | 5/2014 | Hirasawa et al. | 174/50 |

FOREIGN PATENT DOCUMENTS

| | | |
|---|---|---|
| JP | 11-215649 A | 8/1999 |
| JP | 2007-137389 A | 6/2007 |

OTHER PUBLICATIONS

German Office Action dated Apr. 7, 2014 issued for corresponding German Patent Application No. 10 2010 028 570.6.

* cited by examiner

*Primary Examiner* — Stephen Castellano

(74) *Attorney, Agent, or Firm* — Edwards Wildman Palmer LLP

(57) ABSTRACT

A side cover structure of an electric connecting box includes a connecting box main body, an upper cover, and a side cover covering a side opening at the connecting box main body. The side cover includes a vertical shaft through upper and lower supporters, and the connecting box main body includes a bearing. The shaft is engaged slidably and rotatably around the bearing. The bearing includes a stopper preventing the side cover from drawing out upwardly when the side cover in closed condition is moved upwardly, and a receiver supporting the side cover higher than that in closed condition when the side cover is moved upwardly and rotated toward a direction to open. The bearing includes curved upper and lower bearings, and the upper bearing has a top end portion, and a bottom end of the top end portion acts as the stopper to abut on the lower supporter.

7 Claims, 9 Drawing Sheets

SIDE COVER STRUCTURE OF AN ELECTRIC CONNECTING BOX

The priority application Number Japan Patent Application 2009-117822 upon which this patent application is based is hereby incorporated by reference.

TECHNICAL FIELD

This invention relates to a side cover structure of an electric connecting box, in which a side cover covers a side opening of the electric connecting box after an operation, for example connecting with terminals is acted in the electric connecting box through the side opening.

BACKGROUND ART

One embodiment of a side cover structure by prior art is shown in FIG. 10 (Refer Patent Document 1).

The structure includes an electric connecting box 71 having a synthetic resin frame 72, synthetic resin upper and lower covers (not shown) covering the frame 72, a synthetic resin side cover covering the side opening 73 of the frame 72, and a terminal 75 joined with an electric wire to be assembled in the frame 72 through the side opening 73. Guide groves 76 are arranged at both sides of the side opening 73 of the frame 72. The side cover 74 is slid from a top and fitted into the guide grooves so as to cover the side opening 73.

The terminal 75 is formed into an L-shape and includes a top horizontal plate 75a and a bottom wire connecting portion 75b. The horizontal plate 75a includes a frame portion 75c and a slot 75d. A terminal block is arranged in the side opening of the frame 72 and a bus bar (not shown) for power supply is arranged at a top of the terminal block. The frame portion 75c is moved over a bolt head (not shown) at the top of the terminal block, and the horizontal plate 75a is fixed at and connected with the bus bar with a bolt. In FIG. 10, a relay 77 and a fuse 78 are provided as electric components.

The other embodiment of the side cover structure of the electric connecting box by prior art is shown in FIG. 11 (refer Patent Document 1).

In the side cover structure, an electric connecting structure 80 includes a frame 81 having a side opening 82 and a side cover 84 openable horizontally through a thin hinge 83 arranged at one side edge of the side opening 82. When the side cover 84 is closed, simultaneously an engaging hook 85 arranged at the otherside of the side cover 84 is engaged with a lock hook 86 arranged at the other side edge of the side opening 82.

A bus bar 87 is arranged vertically in the side opening. A terminal joined with an electric wire (not shown) is arranged along the bus bar 87. A bolt (not shown) is inserted in a hole 88 at the bus bar 87 and screwed with a nut (not shown) at a rear side of the hole 88, so that the terminal is fixed at and connected with the bus bar 87. A relay 89 arranged at a top of the frame 81 is covered by an upper cover 90.

CITATION LIST

Patent Document 1: Japan Patent Application Published No. 2007-137389 (FIG. 2)
Patent Document 2: Japan Patent Application Published No. H11-215649 (FIG. 1)

SUMMARY OF INVENTION

Objects to be Solved

According to the above structure by prior art, when maintenance of the electric connecting box is acted, it is forgotten to close the side cover 74, 84, or the side cover 74, 84 is incompletely closed. In the case, through the side opening 73, 82 of the frame 72, 81 at the engine room, water penetrates into the frame, thereby, it is afraid that the terminal and an inside circuit have connecting troubles.

According to the above problems, an object of the present invention is to provide a side cover structure of an electric connecting box, which can prevent forgetting to close a side cover or incomplete closing at the electric connecting box.

How to Attain the Object of the Present Invention

In order to overcome the above problems and attain the object of the present invention, a side cover structure includes a connecting box main body, an upper cover, and a side cover covering a side opening for electric connection at the connecting box main body. The side cover includes a vertical shaft, and the connecting box main body includes a bearing. The shaft is engaged slidably in a direction of an axis thereof and rotatably around the axis with the bearing. The bearing includes a stopper (bottom end surface) preventing the side cover from drawing out upwardly when the side cover in a closed condition is moved upwardly, and a receiver (top end surface) supporting the side cover higher than that in the closed condition when the side cover is moved upwardly and rotated toward a direction to open.

According to the structure mentioned above, when the side cove is opened for maintenance, firstly the side cove is slid upward together with the shaft, and opened by rotating outwardly. When the side cover is slid upward, the stopper abuts partially on the side cover, thereby, it is prevented that the side cover is drawn out upward (on the other hand, for example, a flange of a top end of the shaft abuts on a top end of the bearing so as to prevent the side cover from drawing out downward). Thereafter, the side cover is rotated smoothly and securely. When the side cover is rotated outward, the supporter supports the side cover higher than a position of the side cover in the closed condition. Thereby, when it is forgotten that the side cover is closed, the upper cover will abut on a top portion of the side cover, so that the upper cover can not be mounted on the connecting box main body. Thus, forgetting of closing the side cover and incomplete closing the side cover can be detected, so that the side cover can be closed securely.

In the side cover structure according to the present invention, the side cover includes the shaft through upper and lower supporters, and the bearing includes curved upper and lower bearings, and the upper bearing has a top end portion extending along a circular direction longer than the lower bearing, and a bottom end of the top end portion acts as the stopper to abut on the lower supporter.

According to the above structure, the shaft is connected at the upper and lower supporters to the side cover. When the side cover in the closed condition is slid upward, the bottom end of the top end portion of the upper bearing abuts on the top end of the lower supporter, so that the side cover is prevented securely from drawing out upwardly. Thereby, it is not worried that the side cover is left to be opened, and it is prevented to forget closing the side cover.

In the side cover structure according to the present invention, the top end of the upper bearing corresponds to the receiver supporting the upper supporter, or the top end of the lower bearing corresponds to the receiver supporting the lower supporter.

According to the above structure, the upper supporter is supported by the receiver of the upper bearing, or the lower supporter is supported by the receiver of the lower bearing. Thereby, the side cover in an open condition is supported at a higher position than a position in closed condition, so that forgetting of closing and incomplete closing can be detected securely. A position of the receiver can be arranged according to a shape of the side cover.

In the side cover structure according to the present invention, the upper supporter includes the flange at a top end of a supporter main body and the lower supporter includes a lower step portion corresponding to the flange and an upper step portion corresponding to the supporter main body. The top end portion of the upper bearing relatively moves between the lower step portion and the flange when the side cover in the closed condition is moved upwardly/downwardly, and the top end portion of the upper bearing relatively moves between the upper step portion and the supporter main body when the side cover in the closed condition is rotated.

According to the above structure, when the side cover in the closed condition is moved upwardly/downwardly, the bottom end of the top end portion of the upper bearing abuts on the lower step portion of the lower supporter so as to prevent the side cover from moving more upwardly (drawing out), and when the side cover in the closed condition is moved downwardly, the top end of the top end portion of the upper bearing abuts on or near to a flange. When the side cover is rotated to open, the bottom end of the upper supporter main body abuts on the top end of the upper bearing and rotates (slide thereon), or the upper step portion of the lower supporter abuts on the bottom end of the upper bearing and rotates (slide thereon). The side cover is supported at a height corresponding to a length along an upward/downward direction of the upper supporter main body by the upper bearing during the side cover is rotated (opened).

Effects of the Invention

According to the present invention, the upper cover is interfered with the side cover when closing the side cover is forgotten or the side cover is incompletely closed, so that forgetting of closing and incomplete closing can be detected and prevented securely. It can be prevented that water and dust water penetrates through the side opening into the connecting box main body frame, so that a connecting area in the connecting main body is prevented from shorting and connecting troubles.

According to the present invention, since it is securely prevented that the side cover is drawn out upwardly, it is not worried that the side cover is left to be removed, so that forgetting to close the side cover can be securely prevented.

According to the present invention, since the side cover can be securely supported by the receiver at a position in which the side cover is interfered with the upper cover when the side cover is opened, forgetting of closing the side cover and incomplete closing the side cover can be securely detected.

According to the present invention, the side cover is supported by the upper bearing at the height corresponding to the length along a upward/downward direction of the upper supporter main body during the side cover is rotated (opened), so that the side cover can be moved down by its own weight and supported effectively at the position in which the side cover is interfered with the upper cover.

DESCRIPTION OF EMBODIMENTS

Figure 6:
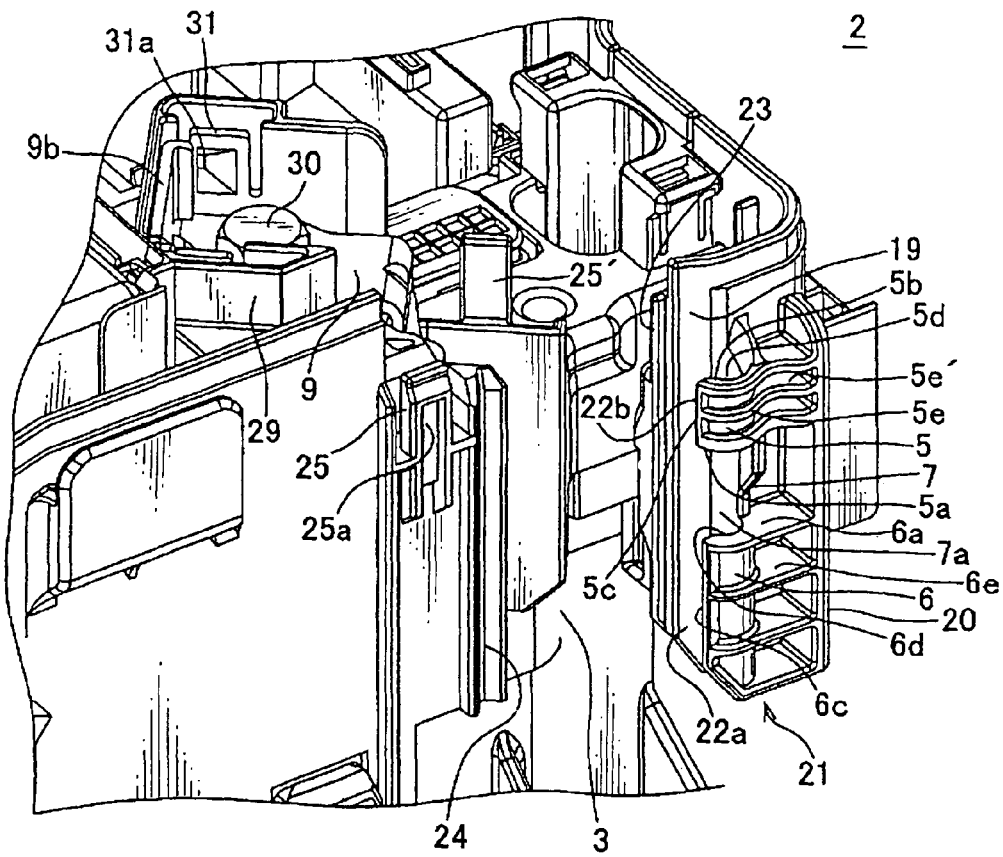
FIG. 6 is a perspective view showing a main area of a frame of the electric connecting box.
Figure 7:
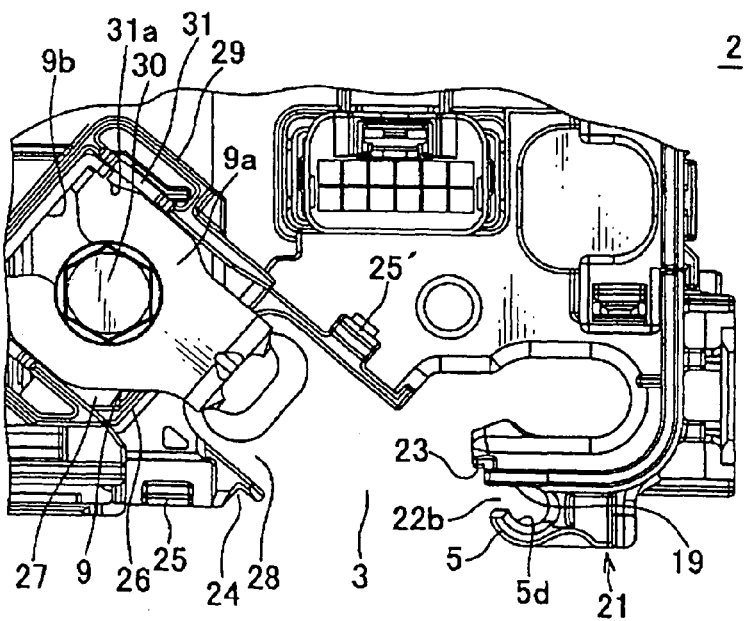
FIG. 7 is a plan view of the main area of the frame of the electric connecting box shown in FIG. 6.

FIGS. 1-5 show one embodiment of a side cover structure of an electric connecting box according to the present invention. FIGS. 6-7 show one embodiment of a frame, and FIGS. 8-9 show one embodiment of a side cover.

Figure 1A:
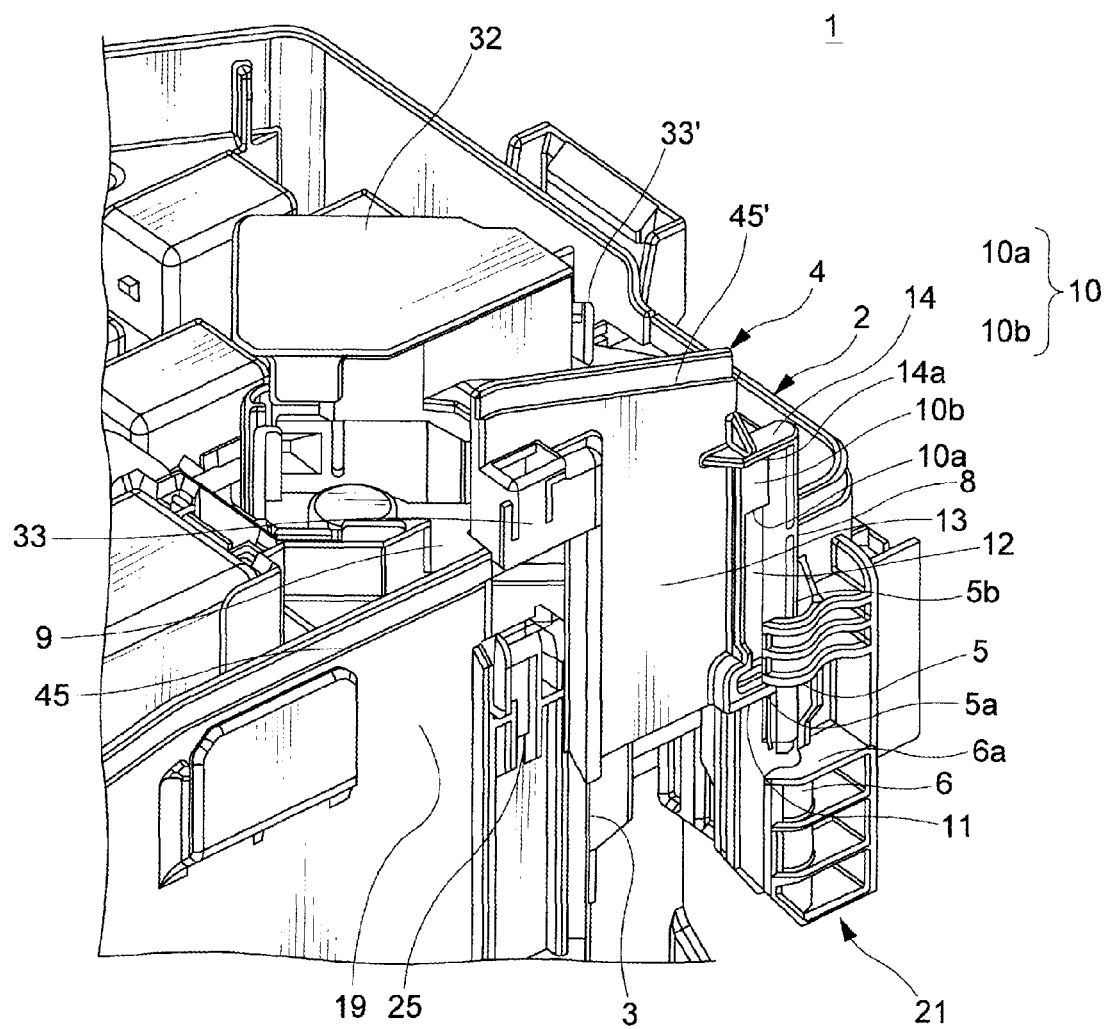
FIG. 1 is a perspective view of a side cover slid upwardly/downwardly in one embodiment of a side cover structure of an electric connecting box according to the present invention.
Figure 1B:
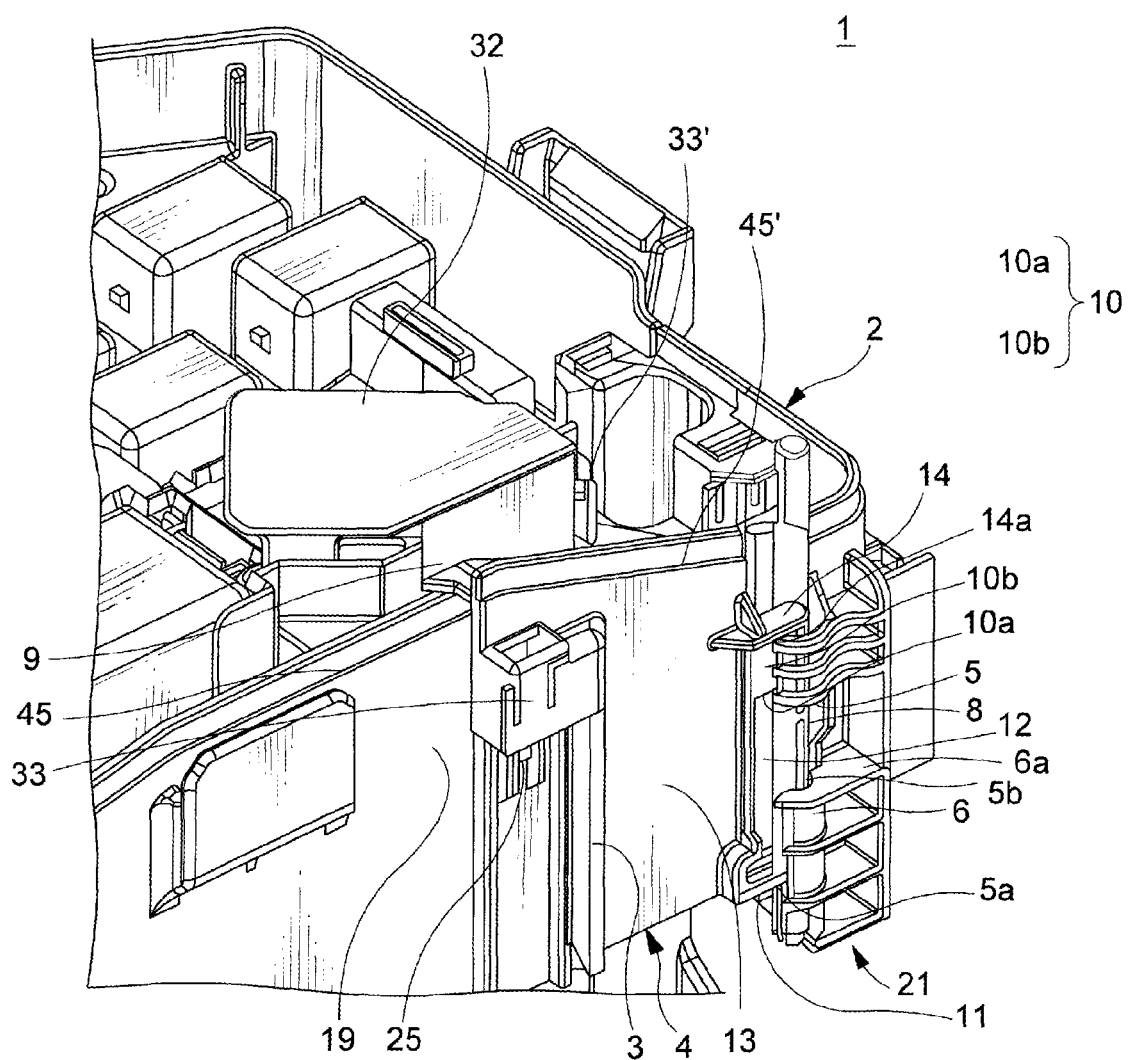
Figure 2A:
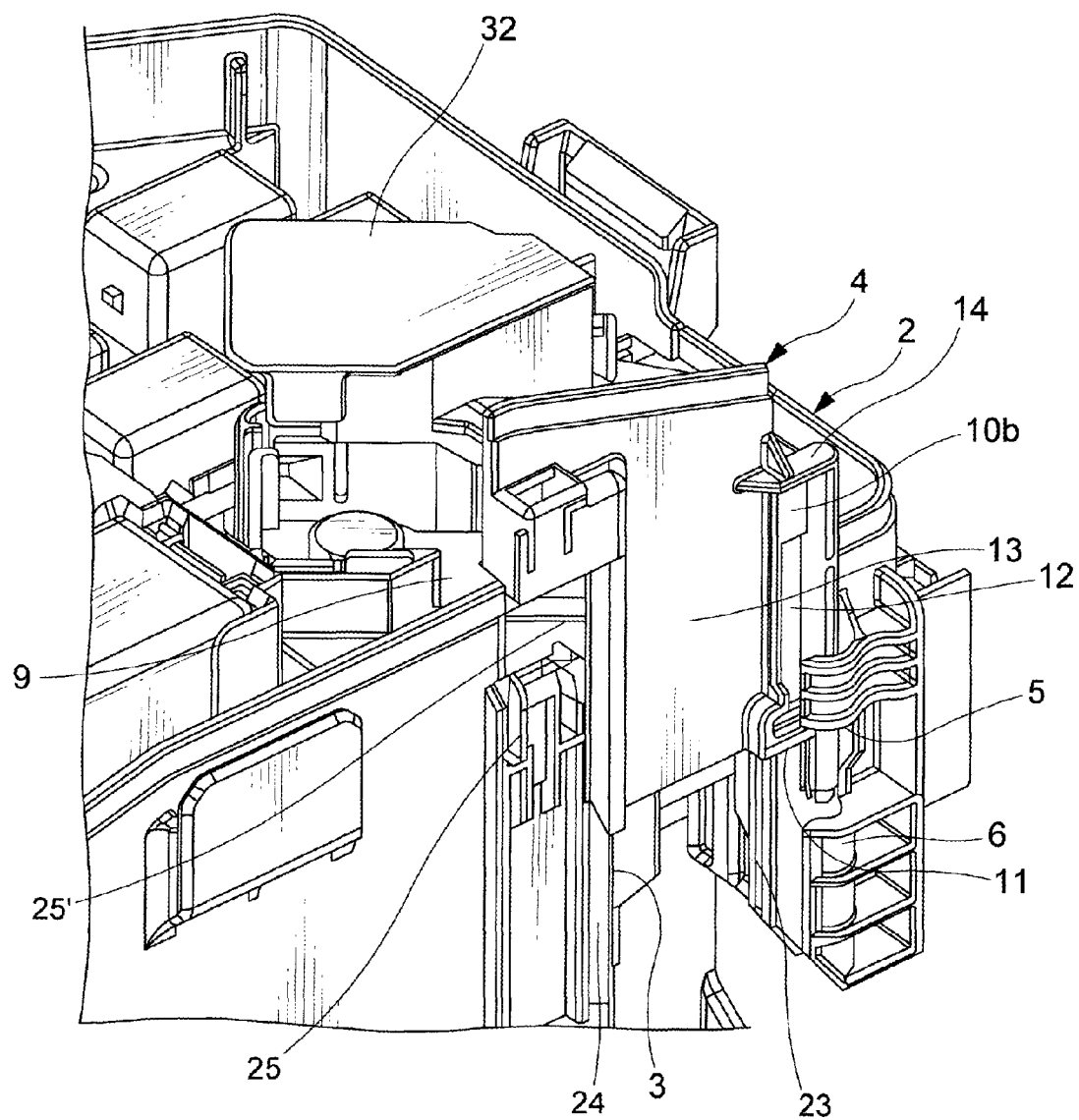
FIG. 2 is a perspective view of the side cover in a rotated condition shown in FIG. 1.
Figure 2B:
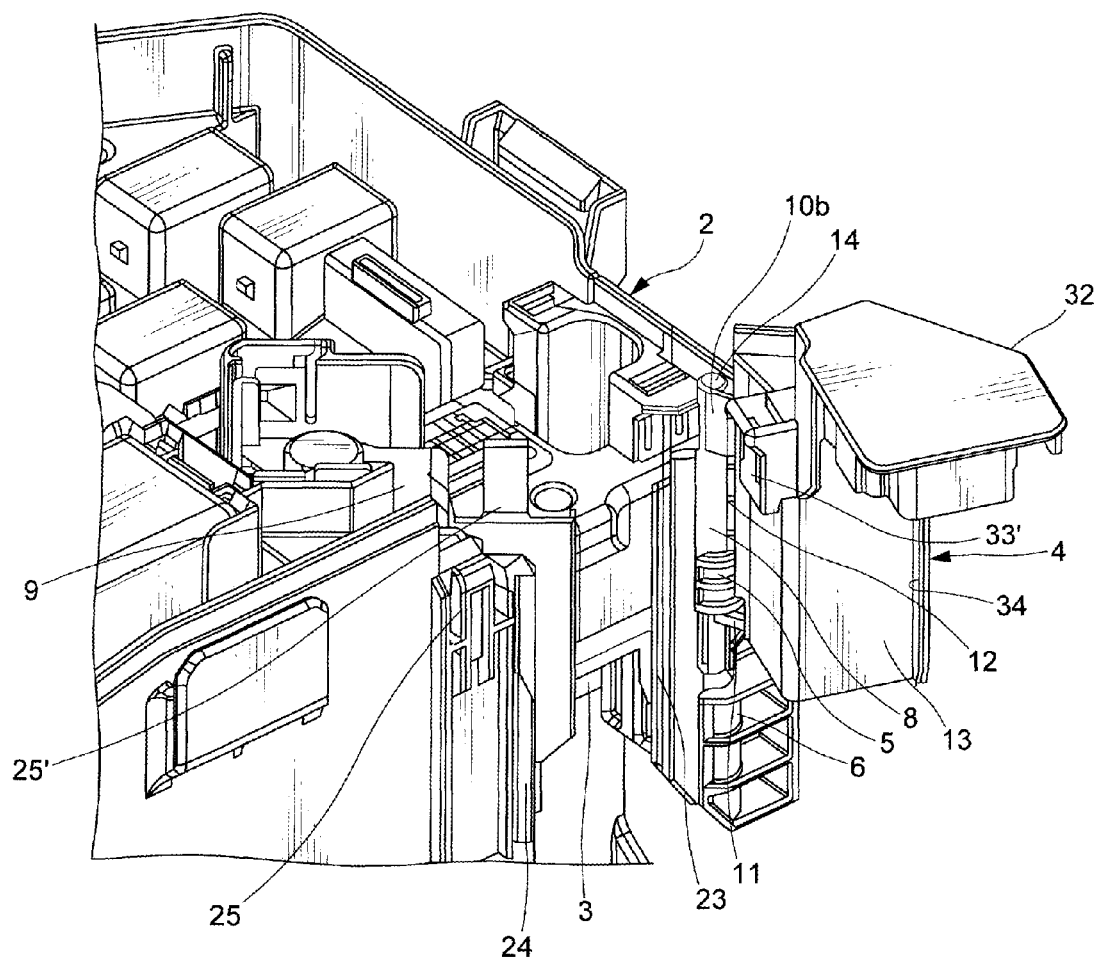

In the structure shown in FIG. 1, the side cover 4 made of synthetic resin is arranged movably upwardly and downwardly at a side opening 3 of the frame 2 made of synthetic resin (connecting box main body) of the electric connecting box 1. The side cover is limited to move upwardly by a stopper (bottom end surface) 5a of an upper bearing 5 of the frame 2. As shown in FIG. 2, the side cover 4 can move openable around upper and lower bearings 5, 6 and a vertical shaft 8 when the side cover is unlocked about the frame 2, and moved upwardly. The side cover 4 opened as shown in FIG. 3 is supported by the upper bearing 5 or the lower bearing 6 so as to project upwardly (the side cover 4 is actually sifted downwardly by its own weight from a position shown in FIG. 3), and the side cover closed at a upper position as shown with two-dot chain lines in FIG. 2 is pushed downwardly by a force including its own weight and locked about the frame 2, so that the side opening 3 is closed by the side cover 4.

Figure 3:
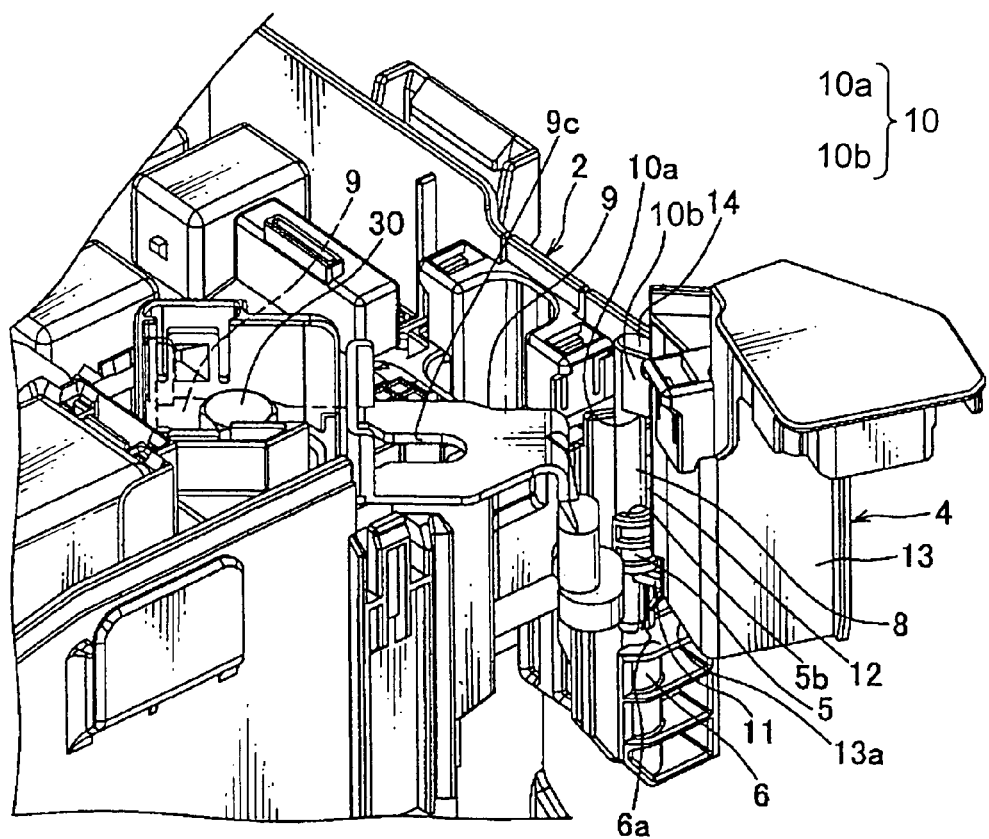
FIG. 3 is a perspective view of mounting a terminal through the opened side cover.

When the side cove 4 is opened as shown in FIG. 3, the terminal joined with a wire (not shown) is mounted or removed. In the embodiment shown in FIG. 3, a plate-shape upper supporter 10 projects radially and perpendicularly to the shaft 8 at a top portion thereof. A horizontal bottom end surface 10a of the upper supporter 10 abuts on an top end surface 5b (receiver) of the upper bearing 5, and the upper and lower bearings 5, 6 engage rotatably in a slit shape gap 12 between the upper supporter 10 and a lower supporter 11 of the shaft 8, so that the side cover 4 projects upwardly at a height corresponding to a vertical length of the upper supporter 10. When a lower half portion of the lower bearing 6 is formed shorter than that shown in FIG. 3 (the lower half portion is eliminated), the upper and lower supporters 10, 11 can be inserted simultaneously into the gap 12 and engaged therewith. Or, when an upper half portion of the lower bearing 6 is formed short (the upper half portion is eliminated), only the upper bearing 5 is inserted into the gap 12 and engaged therewith.

Figure 8:
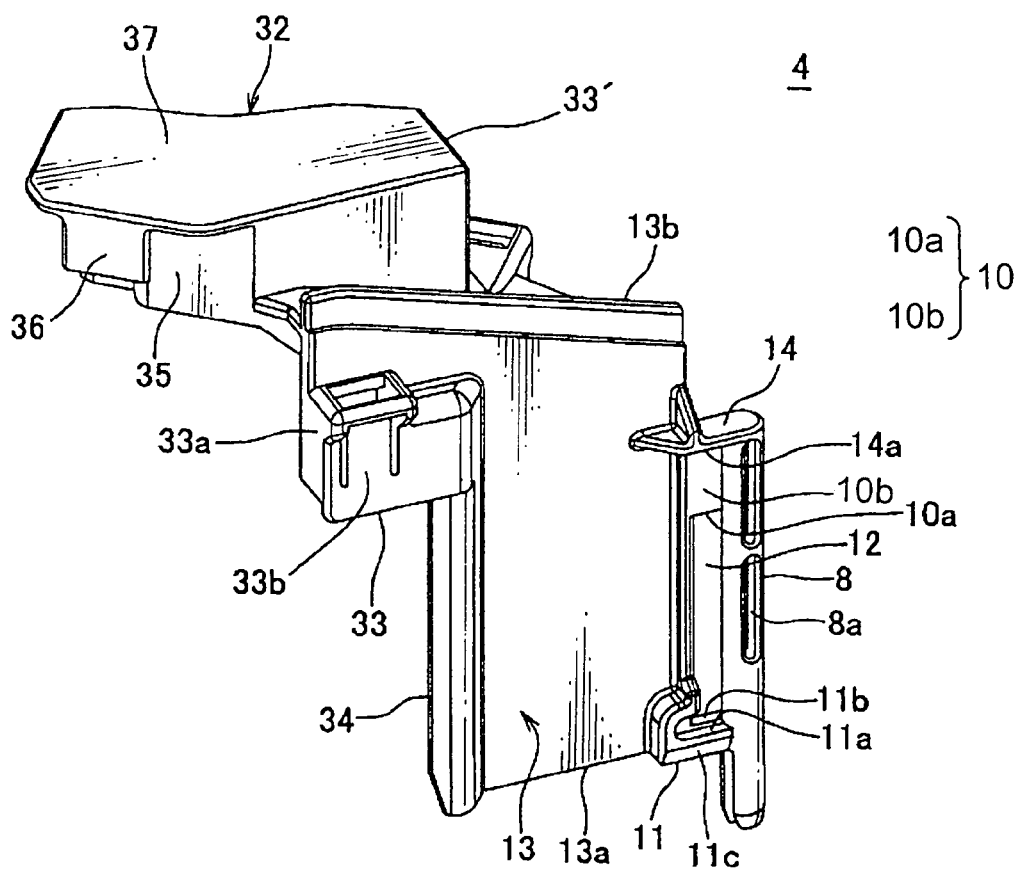
FIG. 8 is a perspective view of a main area of the side cover shown in FIG. 1.
Figure 9:
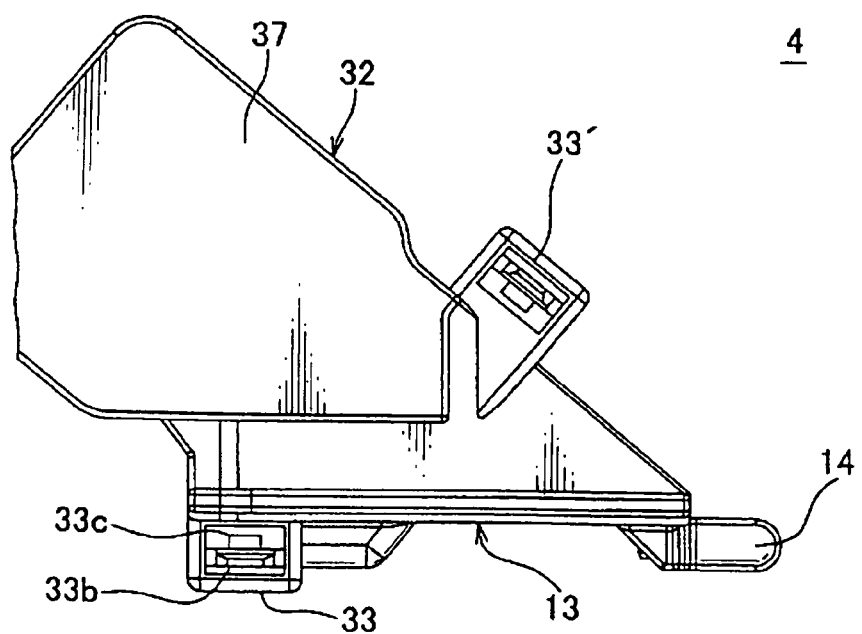
FIG. 9 is a plane view of the main area of the side cover shown in FIG. 8.
Figure 10:
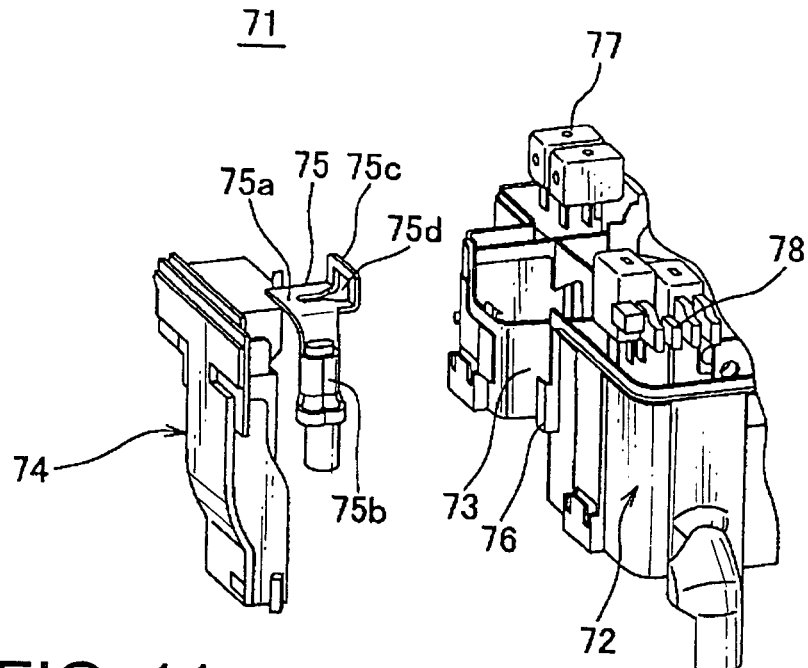
FIG. 10 is an exploded perspective view of one embodiment of a side cover structure of an electric connecting box by prior art.

As shown in FIGS. 1 and 8, the lower supporter 11 is formed with two steps (an upper step 11b and a lower step 11a) projecting radially and perpendicularly to the shaft 8 at a bottom portion thereof, at upper and lower positions vertically along a direction of thickness of the side cover main body 13. The lower step 11a projects more forwardly than the upper supporter 10 (toward a front surface of the side cover main body 13), and the upper step 11b is positioned in the same vertical surface of the upper supporter 10.

The side cover 4 in a closed condition can move upwardly and downwardly between the lower step 11a lower and front side against the upper bearing and a horizontal flange 14 provided integrally at a top end with the upper supporter 10. At a position (lower limit point) in which the side cover 4 is moved down lowest shown with two-dot chain lines in FIG. 1, the top end surface 5b of the top end portion of the upper bearing 5 abuts on a bottom end surface 14a of the flange 14, and when the side cover 4 shown in FIG. 3 is opened, the top end surface 5b of the upper bearing 5 abuts on the bottom end surface 10a of the lower supporter 10 (different from the figure).

In FIG. 3, by making a bottom end surface 13a of the side cover main body 13, that is a bottom end surface of the lower supporter 11, abut on a bottom end surface 6a (receiver) of the lower bearing 6, the side cover 4 can be supported higher. In the embodiment, as mentioned above, the structure, in which the upper supporter 10 abutting on the upper bearing 5 is rotated, will be described.

Figure 4:
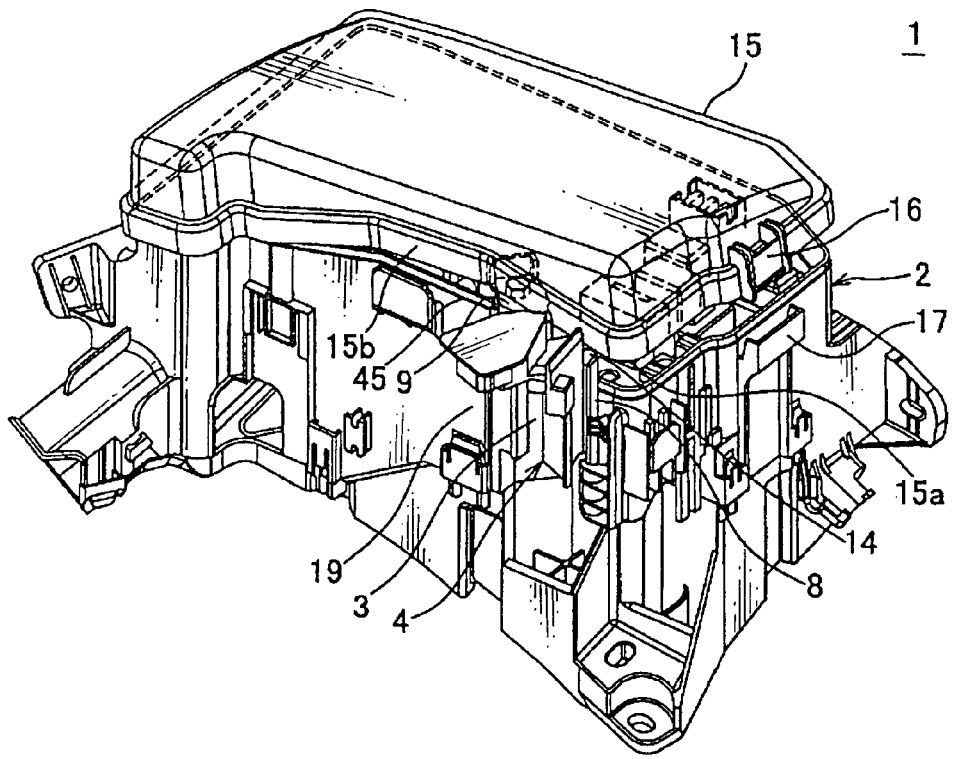
FIG. 4 is a perspective view of the electric connecting box in which the forgetting of closing the side cover is detected by an upper cover.

As shown in FIG. 4, when the side cover 4 is opened as in FIG. 3 and an upper cover 15 is tried to be closed, the upper cover 15 interferes with a horizontal top end surface of the flange 14 of the upper supporter 10 projecting upwardly higher than the lower limit point, so that the upper cover 15 can not be closed (locked). Thereby, forgetting of closing the side cover 4 can be detected, so that the side cover 4 can be closed again and forgetting of closing the side cover can be prevented securely.

When the side cover 4 is positioned in closed condition (at the bottom dead center) shown with two-dot chain lines in FIG. 1, the upper cover 15 is closed and locked completely. A flexible lock arm 16 at one side of the upper cover 15 is engaged with an engaging member 17 of the frame 2, and a bottom edge 15a at a front side of the upper cover 15 is engaged with a receiving piece 18 of the frame 2. In the description, directions of front, rear, right and left are selected suitably.

In FIG. 1, the shaft 8 of the side cover 4 is inserted into the upper bearing 5 from the side of the upper bearing 5, so that the side cover 4 can be easily mounted. The upper bearing 5 is pushed outwardly in a radial direction by the shaft 8, and the upper bearing 5 is elastically restored simultaneously after inserting the shaft 8. The side cover 4 can be inserted vertically from a top side along the side opening 3 of the frame 2 as shown with a solid line in FIG. 1. In this case, a bottom end tapered surface 11c of the lower supporter 11 (FIG. 8) as a guide surface pushes the upper bearing 5 outwardly in the radial direction.

As shown in FIG. 6, a top end portion 5c of the upper bearing 5 projects in a circumferential direction (horizontal direction) longer than the lower bearing 6. A bottom end surface 5a of the top end portion 5c of the upper bearing 5 performs a stopper defining a top dead center of the shaft 8. The upper and lower bearings 5, 6 are arranged with a distance to have a space between the upper and lower bearings 5, 6.

The upper bearing 5 is formed shorter along an upward/downward direction than the lower bearing 6 so as to have inner and outer surfaces with an arc-shape cross-section and bendable outwardly in the radial direction. An inner surface 5d of the upper bearing 5 is formed smooth. An outer surface of the upper bearing 5 is reinforced by a plurality of horizontal arc-shape ribs 5e. A base end of the upper bearing 5 is continued to a common bearing 7 having an inner surface 7a, which has an arc-shaped cross-section and extends in the upward/downward direction. The inner surface 5d of the upper bearing 5 and the inner surface 7a of the common bearing 7 and an inner surface 6d of the lower bearing 6 are continued smoothly with the same radius and no steps. The common bearing 7 is arranged projectingly at a side wall 19 (outer wall) of the frame 2.

The lower bearing 6 is formed longer along the upward/downward direction than the upper bearing 5 so as to have an inner surface 6d and an outer surface with an arc-shape cross-section, and a plurality of rib plates 6e extending horizontally along the circumferential direction and rigid with high stiffness. A top surface 6a of the highest rib plate 6e may perform as a receiver supporting the side cover 4 in the open condition. The rib plates 6e together with the rib plate 5e' continued to the rib 5e of the upper bearing 5 is continued along an outer surface of the common bearing 7 integrally and perpendicularly to the side wall 19 (outer wall) and perpendicularly to a vertical plate 20 for reinforcing, which projects from the side wall 19 and.

A bearing 21 is structured with the upper bearing 5, the lower bearing 6 and the common bearing 7. The arc-shape inner surfaces 5d, 6d of the upper and lower bearings 5, 6 are formed in a range of angle over 180 degrees along the circumferential direction so as to hold the shaft 8 (FIG. 1) without falling. The top end portion 5c (free end) extends in the circumferential direction longer than a top end 6c of the lower bearing 6, so that the range of angle of the inner surface of the upper bearing 5 is larger than that of lower bearing 6.

The shaft 8 (FIG. 1) bends the upper bearing outwardly and is inserted into the upper bearing 5, and slid in the axial direction into the lower bearing 6 from a top thereof. The lower supporter 11 (FIG. 1) passes vertically through a side gap 22a between the top end 6c of the lower bearing 6 and the outer wall 19. A vertical plate-shape upper supporter main body 10b of the upper supporter 10 passes vertically through a side gap 22b between the top end portion 5c of the upper bearing 5 and the outer wall 19.

The bearing 21 is arranged at one side (right edge in the embodiment) of the side opening 3. A vertical flange wall 23 as a guide and a stopper for the side cover 4 extends at the one end of the side opening 3 from an inner surface of the side wall 19 into the side opening 3. A vertical v-shape groove 24 with a V-shape cross-section as a guide and a stopper for the side cover 4 is arranged outwardly at the other end of the side opening 3. A lock pillar 25 (lock member) having a lock groove 25a for locking the side cover 4 is arranged projectingly and vertically. The side opening 3 is formed by cutting out the side wall 19 from the top end to the bottom end thereof with a rectangular shape.

As shown in FIGS. 6-7, in the side opening 3, a rectangular-shaped room 28 is provided for receiving the L-shape terminal 9 joined to the wire in the frame 2 and connecting the terminal 9 to the bus bar 27 on the terminal block 26. A lock pillar 25' (lock member) similar as the lock pillar 25 is vertically provided projectingly at a top area of one edge of the room 28.

A U-shaped peripheral wall 29 is vertically arranged at a top of the terminal lock 26. A horizontal plate 9a of the terminal 9 is inserted through a front opening of the peripheral wall 29 in the peripheral wall 29. A vertical frame 9b at a top end of the horizontal plate 9a passes over a bolt head 30 on the terminal block and is engaged with a flexible lock piece 31 and a projection 31a at both sides in the peripheral wall 29.

The terminal 9 is fixed by screwing the bolt and the horizontal plate 9a is connected with the bus bar 27, as same as prior art.

As shown in FIGS. 8-9, the side cover 4 is structured by a vertical plate-shape side cover main body 13 (accurately triangular cross-sectional shape), a horizontal terminal cover portion 32 formed perpendicularly to a rear surface of a top of the side cover main body 13, a vertical shaft 8 arranged at one side of the side cover main body 13, and each lock portion 33, 33' projecting at an outer surface of the other side and the terminal cover portion 32 of the side cover main body 13.

The shaft 8 projects downwardly from the bottom end 13a of the side cover main body. A lower side of the shaft 8 is connected with the horizontal lower supporter 11 at a bottom end at a front surface of the side cover main body 13. A upper side of the shaft 8 is connected with the horizontal upper supporter 10 below a slant top end 13b of the side cover main body 13. The upper supporter 10 is formed with the vertical plate-shape upper supporter main body 10b and the horizontal flange 14 at a top end thereof. A higher step 11b at a rear side of the lower supporter 11 is arranged under the plate-shape upper supporter main body 10b, and a lower step 11a is arranged at a front side of the step 11b, and the lower step 11a arranged under the bottom end surface 14a of the flange 14. At a bottom end of the lower step 11a, a tapered surface 11c corresponding to the top end of the upper bearing 5 is arranged for sliding contact. A slit-shape gap (room) 12 is surrounded by the shaft 8, the upper and lower supporters 10, 11 and the one end of the side cover main body 13 so as to be a slit shaped.

In FIG. 1, when the top end surface 5b of the upper bearing 5 abuts on the bottom end 10a of the upper supporter 10, the upper supporter 10 and the lower supporter 11 are inserted into the slit-shape gap 12, so that the side cover 4 is supported rotatably. At the lower limit position of the side cover 4, the top end surface 5b of the upper bearing 5 abuts on the bottom end surface 14a of the flange 14, and the top end portion 5c (FIG. 6) of the upper bearing 5 abuts on a surface of the vertical plate-shape upper supporter main body 10b, so that the side cover 4 is made non-rotatable. Additionally, when the side cover 4 is completely closed, rotation of the side cover 4 is stopped by each lock portion 33, 33' and terminal cover portion 32.

As shown in FIGS. 8-9, each lock portion 33, 33' has a vertical flexible piece 33b inside a frame piece 33a of the lock portion 33, 33'. The lock pillar 25, 25' shown in FIG. 6 are inserted into each frame pieces 33a and a groove 25a (FIG. 6) of the lock pillar 25, 25' is engaged with a lock hook 33c (FIG. 9), so that it is prevented that the side cover 4 is drawn out upwardly. One edge of the side cover 4 abuts on the flange wall 23 at the one side of the side opening 3 shown in FIG. 6, and a vertical stripe 34 at the other side of the side cover 4 abuts on the V-shape groove 24. Thereby, the side cover 4 is supported slidably in the upward and downward direction.

The terminal cover portion 32 is formed with a box-shape. A vertical peripheral wall 35 is inserted into the peripheral wall 29 shown in FIG. 29, so that a vertical plate piece 36 outside the peripheral wall prevents the flexible lock piece 31 from bending outwardly. A horizontal top wall 37 of the terminal cover portion 32 may have a spare fuse mount (not shown).

A vertical length of the upper supporter main body 10b is designed slightly longer than a distance from the lock hook 33c of the lock portion 33 to a bottom edge of the lock portion 33 (vertical engaging length), a vertical engaging length of the plate piece 36 and a vertical engaging length of the peripheral wall 35. Thereby, when the top end surface 5b of the upper bearing 5 (FIG. 6) moves from the bottom end surface 14a of the flange 14 to the bottom end surface 10a of the upper supporter main body 10b (the shaft 8 moves upwardly to a position to be rotatable), engaging the lock member 25, 25' at the frame and the peripheral wall 29 with the lock portion 33, the plate piece 36 and the peripheral wall 35 is disengaged, so that the side cover 4 can be openable.

When the vertical length of the upper supporter main body 10b must be designed shorter than the vertical engaging length of the lock portion 33, the plate piece 36 and the peripheral wall 35, by making the bottom end 13a of the side cover main body 13, that is the bottom end of the lower supporter 11, abut on the horizontal rib plate 6a at the upper step of the lower bearing 6, the side cover 4 can be openable.

When the vertical length of the upper supporter main body 10b is designed longer than the vertical engaging length of the lock portion 33, the plate piece 36 and the peripheral wall 35 as shown in the embodiment, by unlocking the engaging of the lock portion 33, 33', and moving (sliding) the side cover 4 upwardly from the lower limit point shown with two-dot chain lines as shown with solid lines in FIG. 1, the top end surface 5b of the upper bearing 5 is supported by the bottom end surface 10a of the upper supporter 10 and the side cover 4 can be rotated to be open as shown in FIG. 2. The upper and lower bearings 5, 6 are inserted into the slit-shape gap 12 between the shaft 8 and the side cover main body 13, so that the side cover 4 can be supported stably.

An upper limit point of the side cover 4 by solid lines in FIG. 1 is shown with two-dot chain lines in FIG. 2. The upper limit point of the side cover 4 shown in FIG. 1 is determined by making the top surface of the lower step 11a (FIG. 8) abut on the bottom end surface 5a of the top end portion of the upper bearing 5. When the side cover 4 is opened and moved upwardly as shown with solid lines in FIG. 2, the bottom edge of the upper bearing 5 abuts in the upper step 11b (FIG. 8) of the lower supporter 11, so that it is prevented that the side cover 4 is moved furthermore upwardly. In this condition, maintenance for the terminal 9 is not acted.

As shown in FIG. 3, the side cover 4 is opened, and the terminal 9 joined with the wire is pulled frontward after unscrewing the bolt 30 at the terminal block. After joining a new optional wire to a replaced terminal 9 as maintenance, the slot 9c of the terminal 9 is inserted again to the bolt 30 and the terminal 9 is connected to the bus bar by screwing the bolt 30.

Next, the side cover 4 is rotated to be close as shown with two dot chain lines in FIG. 2, and the one side edge of the side cover main body 13 abuts on the flange wall 23 at the one side of the side opening 3 of the frame 2. Simultaneously, the vertical stripe 34 at the other side edge of the side cover main body 13 is engaged with the groove 24 at the other side of the side opening 3. Thereafter, the side cover 4 is slid downwardly as shown with two dot chain lines in FIG. 1.

The shaft 8 is slid from the inner surface of the upper bearing 5 to the inner surface of the lower bearing 6. The bottom end surface 14a of the horizontal flange 14 of the upper supporter 10 abuts on the top end surface 5b of the top end portion of the upper bearing 5 (not necessary abutting), and simultaneously the lock portion 33, 33' is engaged slidingly with the lock portion 25, 25' at the frame so that the cover portion 32 of the side cover 4 covers the terminal so as to protect the terminal 9 from touching with outside, water drops and dust.

At a time of mounting the upper cover on the frame 2 when it is unexpectedly forgotten to close the side cover 4 in FIG. 2, the bottom edge 15a of a vertical peripheral wall 15b of the upper cover 15 abuts on a part of the side cover 4 (preferably the top surface of the flange 14) and the upper cover 15 can not be mounted, so that forgetting to close the side cover 4 is detected.

Figure 5:
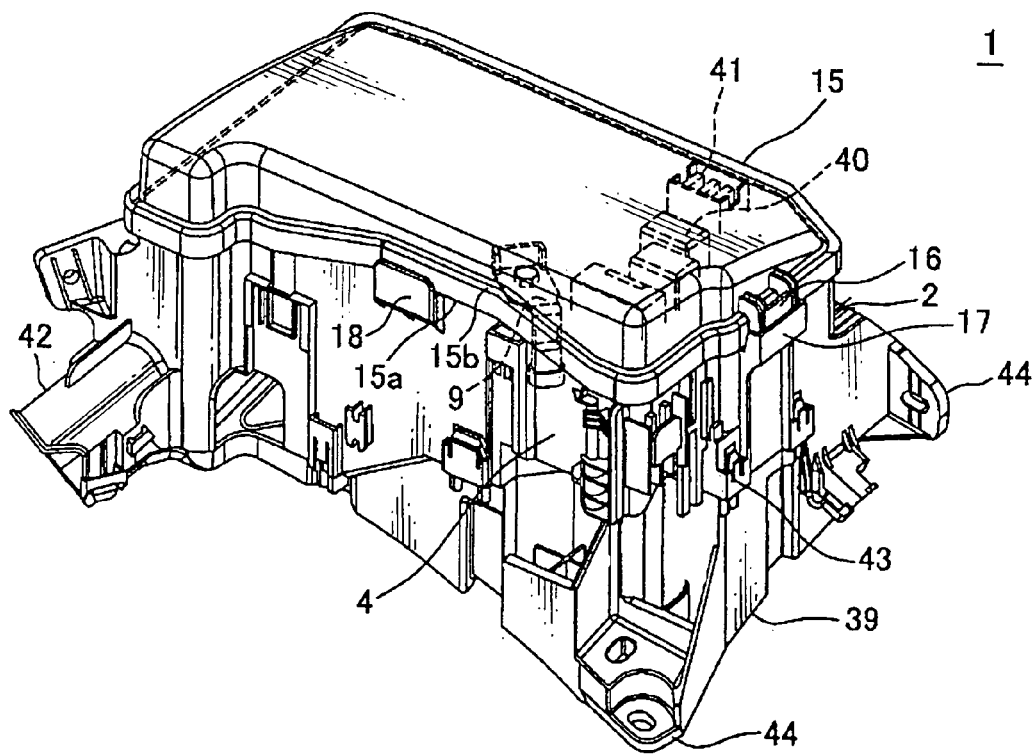
FIG. 5 is a perspective view of the electric connecting box of the embodiment, in which the side cover and the upper cover are completely closed.

As shown in FIG. 5, the upper cover 15 is mounted at an upper area of the frame 2, and a lower cover 39 is mounted at a lower area of the frame 2, and the both covers 15, 39 are locked by the engaging members 17, 43. In the upper cover 15 mounted at the frame 2, electric components, such as a relay 40 and a fuse 41, and a control circuit base board are arranged vertically. In the lower cover 39, electric wires (not shown) connected with the electric components are received and led outwardly from a cylindrical portion 42. The electric connecting box 1 is structured by the frame 2, upper and lower covers 15, 39, side cover 4 and the electric components. The electric connecting box 1 is fixed at brackets 44 of the frame 2 and the lower cover 39 to an engine room of a vehicle.

An upper edge of the side cover 4, which is completely closed and fixed, is positioned inside the peripheral wall 15b of the upper cover 15. The peripheral wall 15b has a step at an inner surface thereof, which is engaged with a step portion 45 (FIG. 4) at an upper area of the peripheral wall (including the side wall 19) of the frame 2. The side opening 3 (FIG. 4) is cut out from the bottom end of the side wall 19 over the step portion 45, that is a top end of the side wall 19. The side cover-main body 13 has a step portion 45' (FIG. 1, as a part of the step portion 45) at a top end thereof, which is continued to the step portion 45 of the side wall 19.

Figure 11:
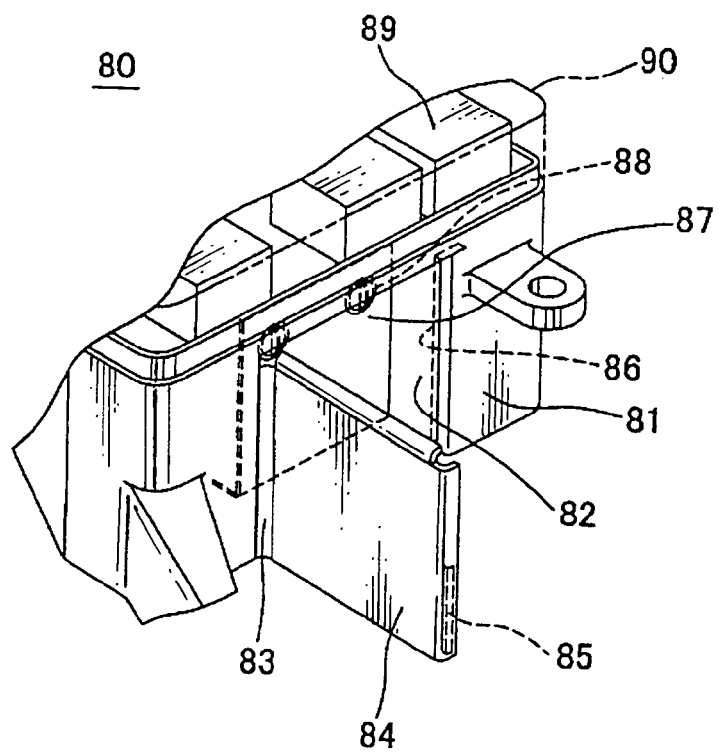
FIG. 11 is a perspective view of another embodiment of a side cover structure of an electric connecting box by prior art.

In the above embodiment, the horizontal terminal cover 32 is provided at the side cover 4. For covering the vertical terminal by prior art as shown in FIG. 11, the side cover main body 13 may be good enough, so that the terminal cover 32 can be eliminated. The side cover 4 can be applied for protecting not only a connecting area of the terminal 9 and the bus bar 27, but also other connecting area of, for example, a fuse (not shown) and the bus bar.

INDUSTRIAL APPLICABILITY

The side cover structure of the electric connecting box according to the present invention can be applied for protecting the connecting area of the terminal joined with the wire for power supply and the bus bar, and preventing from forgetting to close the side cover by detecting fixing condition of the upper cover thereon.

The invention claimed is:

1. A side cover structure of an electric connecting box, comprising:
    a connecting box main body, including a side opening for electric connection, a curved upper bearing and a curved lower bearing;
    an upper cover; and
    a side cover covering the side opening of the connecting box main body, and including a vertical shaft through upper and lower supporters,
    wherein the shaft is engaged with the bearing slidably in a direction of an axis thereof and rotatably around the axis,
    wherein the upper bearing includes a top end portion extending along a circular direction longer than the lower bearing, and a bottom end of the top end portion acts as a stopper abutting on an upper step of the lower supporter when the side cover is moved upwardly, so that it is prevented that the side cover is moved furthermore and drawn out upwardly, and
    wherein a top end of the upper bearing acts as a receiver supporting the upper supporter, a top end of the lower bearing acts as a receiver supporting the lower supporter, and a bottom edge of a vertical peripheral wall of the upper cover abuts on a top surface of the flange of the side cover when the side cover is rotated to be opened, so that the side cover is supported at a higher position when rotated to be opened than when closed, the upper cover cannot be mounted on the connecting box main body completely, and an incomplete closing of the side cover is detected.

2. The side cover structure according to claim 1, wherein the side cover includes the shaft through upper and lower supporters, and the bearing includes curved upper and lower bearings, and the upper bearing has a top end portion extending along a circular direction longer than the lower bearing, and a bottom end of the top end portion acts as the stopper abutting on the lower supporter.

3. The side cover structure according to claim 2, wherein a top end of the upper bearing corresponds to the receiver supporting the upper supporter.

4. The side cover structure according to claim 2, wherein a top end of the lower bearing corresponds to the receiver supporting the lower supporter.

5. The side cover structure according to claim 2,
    wherein the upper supporter includes an upper supporter main body and a flange at a top end of the upper supporter main body, and the lower supporter includes a lower step portion corresponding to the flange and an upper step portion corresponding to the supporter main body, and
    wherein the top end portion of the upper bearing relatively moves between the lower step portion and the flange when the side cover in the closed condition is moved upwardly/downwardly, and the top end portion of the upper bearing relatively moves between the upper step portions and the supporter main body when the side cover in the closed condition is rotated.

6. The side cover structure according to claim 3,
    wherein the upper supporter includes an upper supporter main body and a flange at a top end of the upper supporter main body, and the lower supporter includes a lower step portion corresponding to the flange and an upper step portion corresponding to the supporter main body, and
    wherein the top end portion of the upper bearing relatively moves between the lower step portion and the flange when the side cover in the closed condition is moved upwardly/downwardly, and the top end portion of the upper bearing relatively moves between the upper step portion and the supporter main body when the side cover in the closed condition is rotated.

7. The side cover structure according to claim 4,
    wherein the upper supporter includes an upper supporter main body and a flange at a top end of the upper supporter main body, and the lower supporter includes a lower step portion corresponding to the flange and an upper step portion corresponding to the supporter main body, and
    wherein the top end portion of the upper bearing relatively moves between the lower step portion and the flange when the side cover in the closed condition is moved upwardly/downwardly, and the top end portion of the upper bearing relatively moves between the upper step portion and the supporter main body when the side cover in the closed condition is rotated.

* * * * *